United States Patent
Donley et al.

(10) Patent No.: US 9,467,482 B2
(45) Date of Patent: Oct. 11, 2016

(54) REVERSE PREFIX DELEGATION

(71) Applicant: Cable Television Laboratories, Inc., Louisville, CO (US)

(72) Inventors: Christopher J. Donley, Broomfield, CO (US); Christopher Grundeman, Denver, CO (US); Vikas Sarawat, Broomfield, CO (US); Karthik Sundaresan, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 618 days.

(21) Appl. No.: 13/754,954

(22) Filed: Jan. 31, 2013

(65) Prior Publication Data

US 2014/0215038 A1   Jul. 31, 2014

(51) Int. Cl.
| | | |
|---|---|---|
| *G06F 15/173* | (2006.01) |
| *H04L 29/06* | (2006.01) |
| *H04L 12/24* | (2006.01) |
| *G06F 15/16* | (2006.01) |
| *H04L 29/12* | (2006.01) |

(52) U.S. Cl.
CPC ......... *H04L 65/103* (2013.01); *H04L 41/0213* (2013.01); *H04L 61/2015* (2013.01); *H04L 65/1053* (2013.01); *H04L 61/6068* (2013.01)

(58) Field of Classification Search
CPC ....... H04L 45/00; H04L 29/06; H04L 80/72; H04L 29/08144
USPC ........ 709/204, 206, 220–229, 238–240, 203, 709/230, 231, 250
See application file for complete search history.

(56) References Cited

U.S. PATENT DOCUMENTS

| | | | |
|---|---|---|---|
| 8,059,661 B2 | 11/2011 | Patel | |
| 8,953,601 B2* | 2/2015 | Kaippallimalil | H04L 29/12028 370/392 |
| 9,112,764 B2* | 8/2015 | Howard | H04L 45/00 |
| 2006/0072543 A1* | 4/2006 | Lloyd | H04L 12/2602 370/351 |
| 2012/0011274 A1* | 1/2012 | Moreman | 709/238 |
| 2012/0177054 A1* | 7/2012 | Pati et al. | 370/395.53 |
| 2012/0314705 A1* | 12/2012 | Howard | H04L 45/16 370/390 |
| 2013/0091254 A1* | 4/2013 | Haddad et al. | 709/220 |
| 2014/0108597 A1* | 4/2014 | Donley | H04L 61/2015 709/217 |
| 2014/0108673 A1* | 4/2014 | Grundemann | H04L 61/2015 709/245 |
| 2015/0036483 A1* | 2/2015 | Hassan | H04L 45/50 370/223 |
| 2015/0263899 A1* | 9/2015 | Tubaltsev | H04L 45/02 370/254 |
| 2015/0263946 A1* | 9/2015 | Tubaltsev | H04L 45/02 370/392 |

OTHER PUBLICATIONS

Basic Requirements for IPv6 Customer Edge Routers draft-ietf-v6ops-6204bis-12, H. Singh, Oct. 30, 2012.
(Continued)

*Primary Examiner* — Zarni Maung
(74) *Attorney, Agent, or Firm* — Greak Lakes Intellectual Property, PLLC.

(57) ABSTRACT

Prefix delegation for Internet protocol (IP) prefixes or other types of prefixes. The prefix delegation resulting in multiple prefixes being delegated to internal routers and/or customer premise equipment (CPE) associated with a common link wherein at least two of the delegated prefixes are associated with different service providers.

14 Claims, 4 Drawing Sheets

(56) References Cited

OTHER PUBLICATIONS

RFC 2131, Dynamic Host Configuration Protocol, R. Droms, Mar. 1997.
RFC 3315, Dynamic Host Configuration Protocol for IPv6 (DHCPv6), R. Droms, Jul. 2003.
RFC 3633, IPv6 Prefix Options for Dynamic Host Configuration Protocol (DHCP) version 6, O.Troan, Dec. 2003.
RFC 6204, Basic Requirements for IPv6 Customer Edge Routers, H. Singh, Apr. 2011.

\* cited by examiner

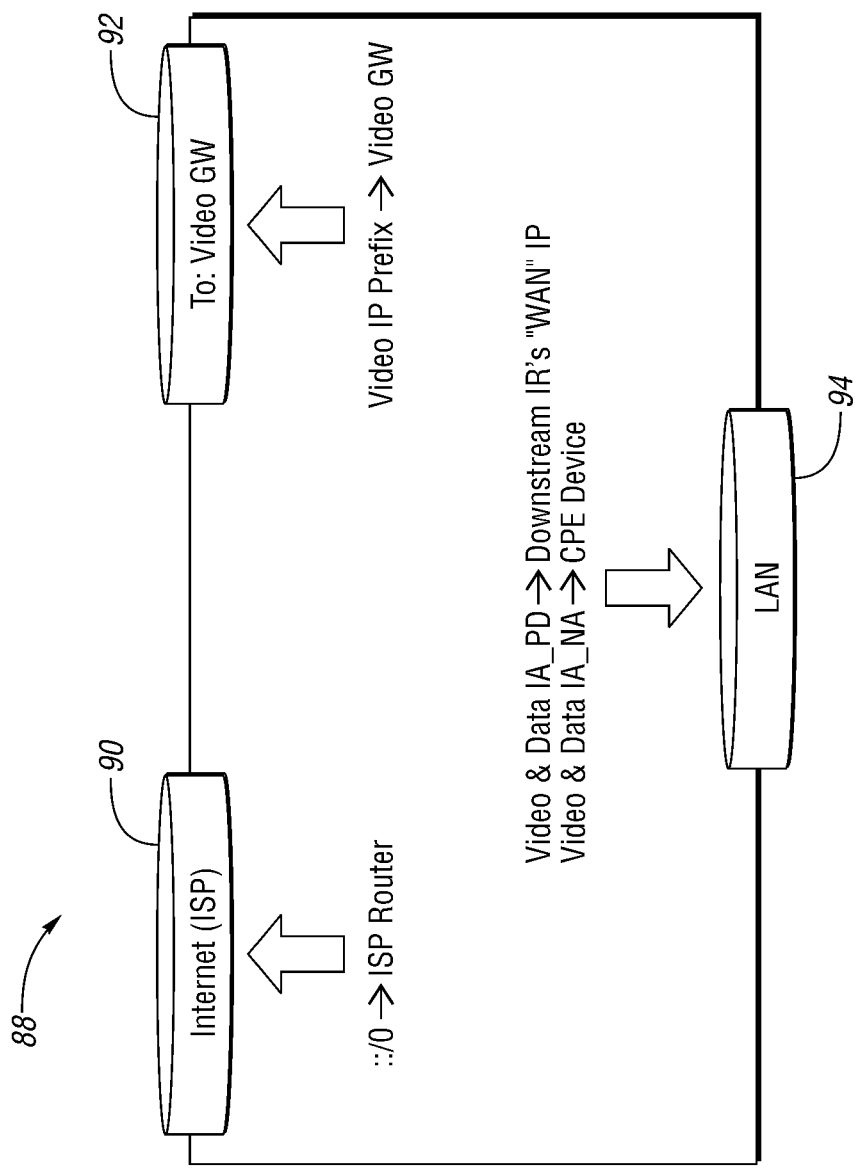

REVERSE PREFIX DELEGATION

TECHNICAL FIELD

The present invention relates to prefix delegation, such as but not necessarily limited to delegating Internet protocol (IP) prefixes used to facilitate IP related addressing, including that associated with IPv4 and IPv6.

BACKGROUND

Dynamic Host Configuration Protocol (DHCP), such as that described in Internet Engineering Task Force (IETF) request for comment (RFC) 2131 and 3315, the disclosures of which are hereby incorporated by reference in their entirety, operate such that customer premise equipment (CPE) and internal routers (IRs) listen to no more than one DHCP server for prefix/address delegation when multiple DHCP servers are active on a particular link at any one time. This DHCP server restriction requires a home network, a private network or other common link to utilize a single DHCP server, commonly referred to as an edge router, to delegate IP prefixes, addressing blocks or other addressing related information to IRs and/or to assign IP addresses, addresses or other addressing information directly to CPE in the event no internal routers are positioned between the edge router and the CPE. The DHCP server restriction, as a result, limits the addressing available over a common link to IP prefixes and IP address within a domain of a delegating router associated with a service provider of the edge router.

The present invention contemplates a need for IRs and CPE associated with a common link to be delegated IP prefixes and/or IP addresses from multiple service providers. The ability to delegate IP prefixes and/or IP addresses from multiple service providers may be beneficial in allowing commonly linked IRs and CPE to support IP prefix/address dependent messaging, signaling and communications for multiple service providers. Support for multiple service provider prefixes can be important to permitting access to disparate networks supported by different service providers, such as but not necessary limited to facilitating access to a data network associated with an Internet service provider while facilitating access to a video network associated with a multiple system operator (MSO).

A single DHCP server, if compliant with IETF RFC 3633, the disclosure of which is hereby incorporated by reference in its entirety, may be able to delegate multiple IP prefixes if multiple IP prefixes are available within a domain of a service provider. RFC 3633 suffers from the DHCP server restrictions identified above with respect to RFC 2131 and 3315 at least in that it fails to define a mechanism by which prefixes sourced from multiple service providers can be delegated from a single edge router. This restriction accordingly prevents the use of RFC 3633 to facilitate delegating multiple IP prefixes for disparate service providers over a common link.

BRIEF DESCRIPTION OF THE DRAWINGS

FIG. 5 illustrates a routing table as contemplated by one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
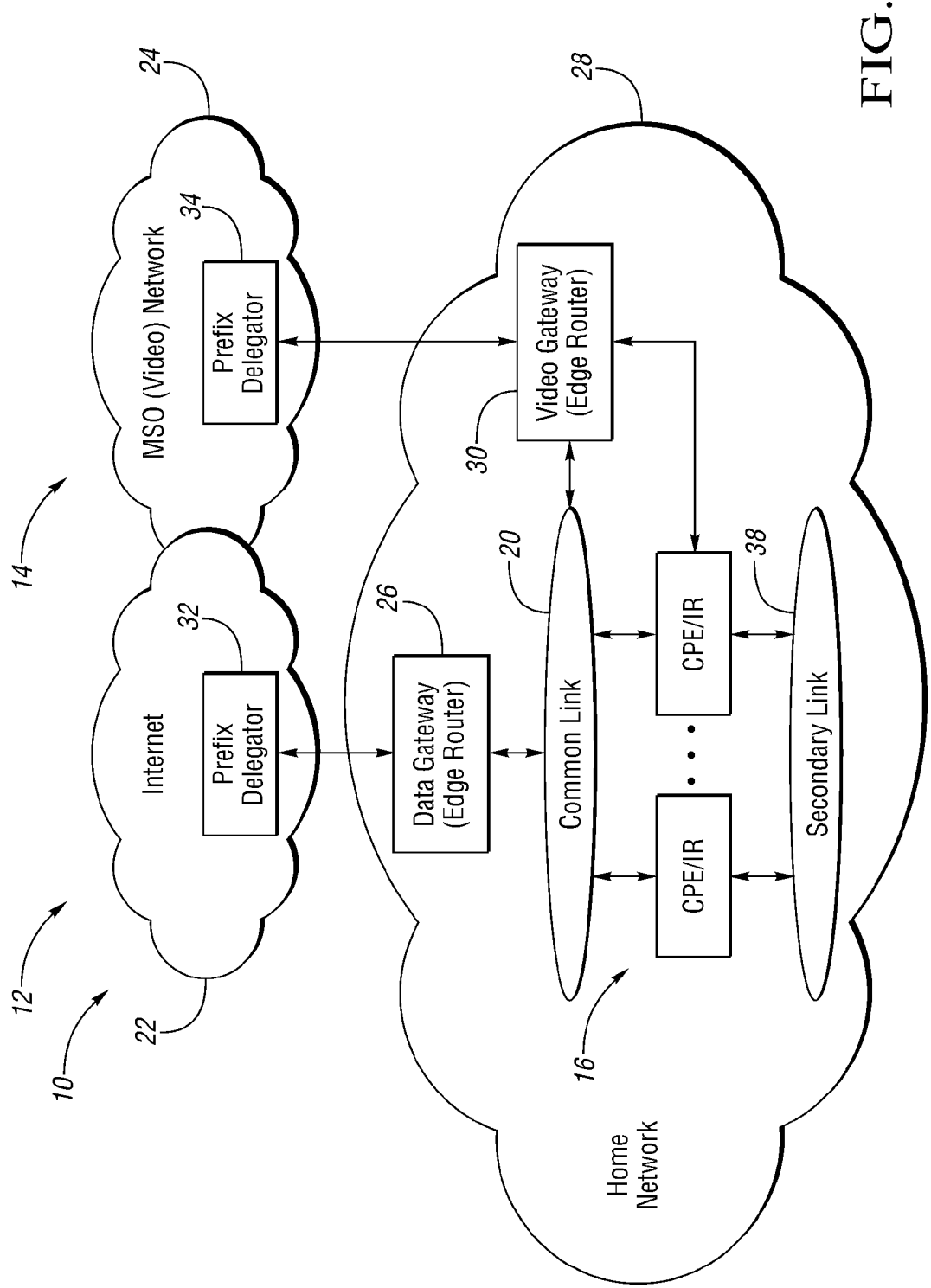
FIG. 1 illustrates a prefix delegation system in accordance with one non-limiting aspect of the present invention.

FIG. 1 illustrates a prefix delegation system 10 in accordance with one non-limiting aspect of the present invention. The system 10 may be configured to facilitate delegating prefixes and/or addresses associated with multiple service providers 12, 14 to consumer premise equipment (CPE) and/or internal routers (IRs) 16 connected over a common link 20. The multiple service providers 12, 14 are shown for exemplary non-limiting purposes to correspond with an Internet service provider (ISP) 12 operable to facilitate access to the Internet 22 and a multiple system operator (MSO) 14 operable to facilitate access to a video network 24. The illustration demonstrates one use of the present invention to facilitate prefix/address delegation when access to one type of service requires the use of prefixes within a domain of one service provider and access to another type of services requires the use of prefixes within a domain of another service provider. In the illustrated example, access to ISP related data services may be dependent on prefixes within a domain of the ISP 12 and access to MSO related video, television, movies and other audio/visual services may be dependent on prefixes within a domain of the MSO 14.

The prefix dependent access may result from the ISP, MSO 12, 14 or other service provider requiring use of specific prefixes in order to interact with certain servers or other infrastructure (not shown) required to access services. The prefix restrictions may be beneficial in allowing the particular service provider to control access to services by limiting accessibility to designated prefixes. The prefix restrictions may also be beneficial in complying with licensing agreements and other use restrictions that designate certain prefixes for digital rights management (DRM) or for otherwise obtaining entitlements and permissions to content. The prefix restrictions can also be used to ensure communications occur through desired communication mediums and/or devices, e.g., the MSO 14 may require use of certain prefixes in order to ensure signaling is carried through the video network 24 and not the Internet 22 as the video network 24 may provide a higher quality of service, more control or better reliability than less regulated or non-proprietary communications carried over the Internet 22. The prefix restrictions may prevent the use of network address translators (NATs) or other devices that share prefixes/addresses with additional devices as such NATs may be expensive to implement/maintain and may jeopardize security and/or DRM.

The system 10 is described with respect to facilitating prefix delegation for two service providers where one service provider 12 supports data related services (Internet) and another service provider 14 supports video services (video network) for exemplary non-limiting purposes as the present invention fully contemplates its use and application in facilitating prefix delegation for any number of service providers and for any type of service provider. In particular, the present invention at least contemplates facilitating prefix delegation for multiple links and/or multiple CPE/IRs where the links, CPE/IRs and/or service providers facilitate access to or use of cellular services, wireless services (Wi-Fi-Wi-Fi Max, Zigbee, 802.11, etc), wireline services (optical, cable, hybrid fiber coaxial, etc.), cable/broadcast/satellite television services and/or any other type of service that requires prefix dependent communications. In addition to the prefix dependent restrictions, the present invention contemplates other potential restrictions influencing prefix delegation, such as but not necessary limited to restrictions attendant to protocols, standards or other operational restraints on the devices and/or processes responsible for facilitating prefix delegation.

One non-limiting aspect of the present invention contemplates prefix delegation within operating constraints attendant to Dynamic Host Configuration Protocol (DHCP), the disclosure of which is hereby incorporated by reference in its entirety. The present invention is predominately described with respect to facilitating delegation of Internet Protocol (IP) related prefixes associated with IPv4 and IPv6, the disclosures of which are hereby incorporated by reference in their entirety, for exemplary non-limiting purposes and fully contemplates its use and application in facilitating delegation of other types of prefixes. The prefix delegation constraints associated with DHCP may correspond with the CPE/IRs 16 being configured to listen to a single edge router 26 when obtaining IP prefixes and/or IP addresses. The edge router 26 may be a data gateway 26 where the data gateway 26 is configured to facilitate interfacing signaling carried over a home network 28 with the Internet 22. The common link 20 may be a component of the home network 28, such as a wireless portion of the home network 28 created in maintaining to facilitate signaling between the data gateway 26 and the CPE/IRs 16. The data gateway 26 may be configured in accordance with DHCP to facilitate delegating IP prefixes within the domain of the ISP 12 to the CPE/IRs 16 and operable in accordance with the present invention to facilitate delegating IP prefixes for multiple service providers.

A video gateway 30 may be included to facilitate signaling between the video network and the CPE/IRs. The video gateway 30 may be characterized as an edge router and configured to facilitate IP prefix and IP address delegation according to DHCP. The video gateway 30 is shown to be independent of the data gateway 26 to illustrate one non-limiting aspect of the present invention where the data gateway 26 is provided or supported by the ISP 12 and the video gateway 30 is provided or supported by the MSO 14. The video gateway 30 may include capabilities particular suitable to facilitating access and/or use of video, e.g., the video gateway 30 may be a set top box (STB), a tuner, a digital video recorder (DVR), a digital video streaming device and the like. The video gateway 30 may include conditional access (CA), certificates or other security measures that require the video gateway 30 to be configured with certificates or other permissions prior to interfacing with the video network. The security measures implemented on the video gateway 30 may be distinct from those on the data gateway 26 in that the MSO 14 may use proprietary encryption that requires the video gateway 30 to be provided signaling directly from MSO 14 or licensed from the MSO 14 whereas to the data gateway 26 may be an off-the-shelf component operating according to commonly available security measures.

An ISP prefix delegator 32 may be included to facilitate management and delegation of IP prefixes within a domain assigned for use with the ISP 12 and a similar MSO prefix delegator 34 may be included to facilitate management and delegation of IP prefixes within a domain assigned for use with the MSO 14. The ISP and MSO prefix delegators 32, 34 may be assigned distinct IP prefixes and may be characterized as delegating routers. The ISP and MSO prefix delegators 32, 34 may respectively cooperate with the data gateway 26 and the video gateway 30, which may be considered as requesting routers, to facilitate delegating prefixes over the common link 20. The common link 20 is shown for exemplary non-limiting purposes as corresponding with a portion of the home network 28 of a subscriber, such as a wireless or wireline network maintained at a subscriber location by the data gateway 26. The ISP and MSO prefix delegators 32, 34 are shown to communicate with a single data gateway 26 and a single video gateway 30 for exemplary purposes as the present invention fully contemplates facilitating similar operations with any number of addition data and/or video gateways 26, 30 or other types of gateways performing relating operations for other home network and communication links.

The CPE and IRs 16 connected to the common link 20 may be configured to facilitate access to any type of service offered by the ISP, MSO 12, 14 or other service provider operable within the system. The CPE 16 may be computers, mobile phones, settop boxes (STBs), media terminal adaptors (MTAs), appliances, televisions, home security systems, tablets and the like. The home network 28 may be configured such that the CPE 16 communicate directly with the data gateway 26 or one or more intermediary IRs 16. The IRs 16 may be configured to route or otherwise direct messaging between the CPE 16 themselves (internally over the common link 20) and/or externally with devices (not shown) outside of the data gateway 26 associated with the Internet 22 and/or MSO network 24. The IRs 16 may be differentiated from the data gateway 26 and the video gateway 30 in order to present a hierarchical structure where the data gateway 26 and the video gateway 30 are considered as edge routers, such as in the manner described in U.S. patent application Ser. No. 13/652,700, the disclosure of which is hereby incorporated by reference in its entirety. The edge routers 26, 30 and the internal routers 16 may be configured to comply with RFC 6204, RFC 6204BIF, and IPv4 and IPv6 eRouter Specification (CM-SP-eRouter-I08-120329), the disclosures of which are hereby incorporated by reference in their entirety.

The video gateway 30 may communicate over the common link 20 with the data gateway 26 such that the video gateway 30 may be characterized when acting in this capacity as one of the CPE/IRs 16. The data gateway 26 may delegate the video gateway 30 an IP prefix/address within the domain of the ISP 12 in order to facilitate communications over the common link 20. The video gateway 30 may also act in the capacity of a DHCP edge router with respect to a secondary communication link 38. The secondary communication link 38 may correspond with a wireline or a wireless network established between the CPE/IRs 16 and the video gateway 30, i.e., a route independent of the data gateway 26. One non-limiting aspect of the present invention contemplates the secondary link 38 comprising a wireline network connecting between one or more of the CPE 16 and the common link comprising separate wireless network. The secondary link 38 may be a wireline network established using coaxial cabling within a home to connect one STB with another STB or DVR within the home to facilitate network DVR and other television related operations, such as in the manner described in MoCA 1.1 Specification for Device RF Characteristics, V1.0-20120815, the disclosure of which is hereby incorporated by reference.

The communications carried over the common link 20, the secondary link 38 and the links between the data and video gateways 26, 30 associated with the ISP and MSO 12, 14 may be facilitated with interfaces included as part of the data/video gateways 26, 30 and the CPE/IRs 16. The data and video gateways 26, 30 are shown to include three interfaces and the CPE/IRs 16 are shown to include two interfaces but each may include more or less interfaces (interfaces are represented within arrows connecting to the corresponding device). The interfaces may be local area network (LAN) interfaces and/or wide area network (WAN) interfaces depending on whether the particular interface is being used to facilitate upstream or downstream signaling. Each of the data/video gateways 26, 30 and CPE/IRs 16 may include a computer-readable medium having non-transitory instructions stored thereon that execute in cooperation with a processor to facilitate the various operations contemplated by the present invention. One non-limiting aspect of the present invention contemplates the devices 16, 26, 30 having instructions sufficient to facilitate reverse prefix delegation where a prefix delegated to the video gateway 30 from the MSO 14 may be reversely delegated to the data getaway 26 for use in subsequent delegation to the CPE/IRs 16 over the common link 20 in addition to prefixes delegated to the data gateway 26 from the ISP 12.

Figure 2:
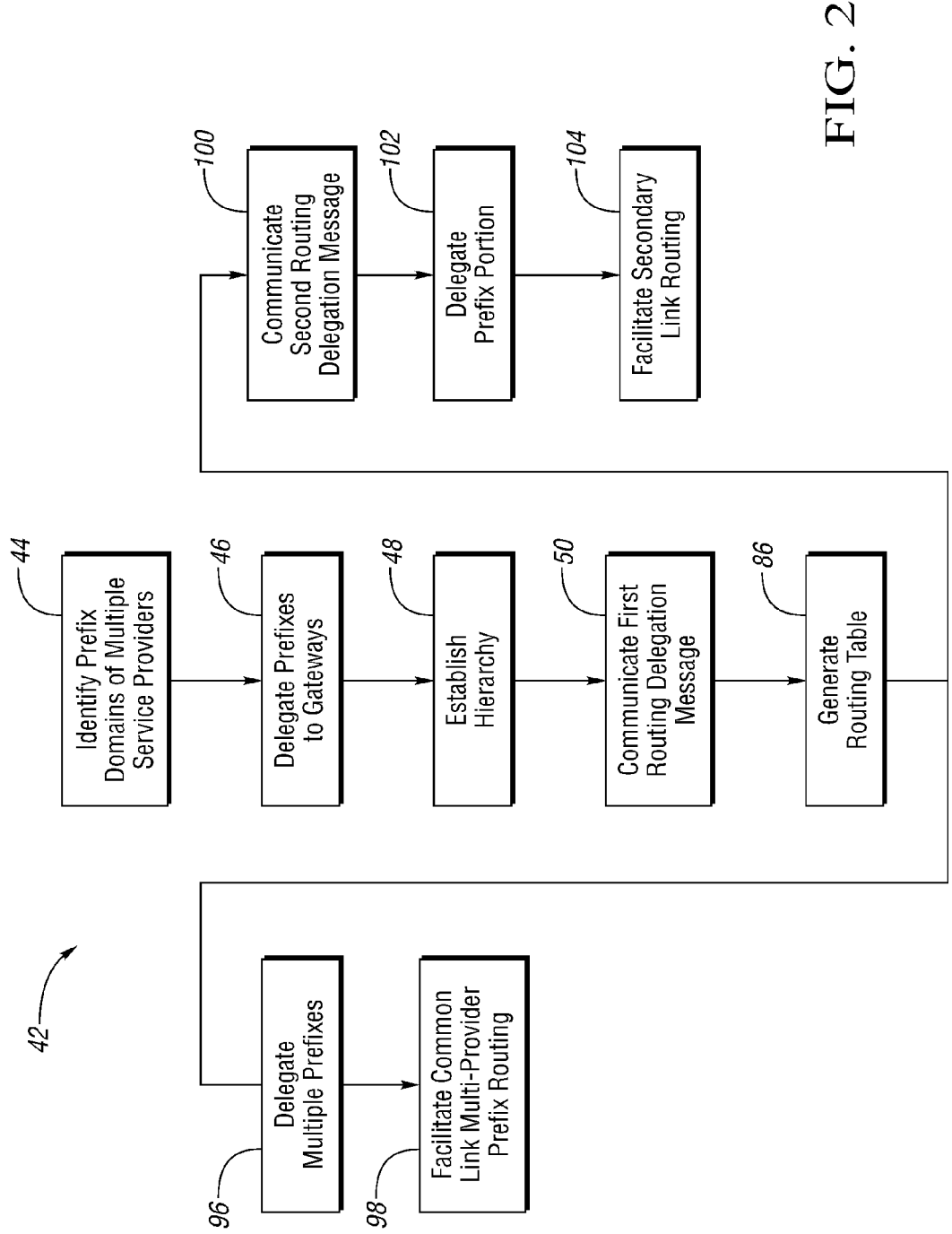
FIG. 2 illustrates a flowchart for a method of prefix delegation contemplated by the present invention.

FIG. 2 illustrates a flowchart 42 for a method of prefix delegation contemplated by the present invention. The method is predominately described with respect to delegating a first IP prefix provided to the video gateway 30 from the MSO 14 to the data gateway 26 for subsequent delegation with a second IP prefix provided to the data gateway 26 from the ISP 12. The present invention characterizes this process as reverse prefix delegation since the video gateway 30 reversely delegates the first IP prefix to the data gateway 26 for delegation rather than itself delegating an entirety of the first IP prefix. The method is described with respect to delegating IP prefixes without necessarily intending to limit the scope and contemplation of the present invention. While the method is described with respect IP prefixes associated with the ISP 12 and the MSO 14, the present invention is not necessarily so limited and fully contemplates the IP prefixes or other delegated prefixes being within a domain of any other type of service provider besides the ISP 12 and the MSO 14. In particular, the present invention contemplates the first and second IP prefixes, or additional prefixes used in combination with the first and second prefixes, being associated with multiple data providers, such as to facilitate multihoming where a CPE is granted access to a visitor network and its service provider network while also being granted access to its home service provider network.

Block 44 relates to identifying prefix domains for multiple service providers. The prefix domains may correspond with the first and second IP prefixes associated/registered to the ISP 12 and the MSO 14 and/or other IP prefixes associated with other types of service providers other than the ISP 12 and the MSO 14. The first and second IP prefixes may be provided to the prefix delegators 32, 34 associated with each of the ISP and MSO 12, 14. The first and second IP prefixes may define a range or a block of IP addresses that have been made available to the corresponding service provider for use in facilitating messaging, signaling and other messaging dependent operations. The IP prefixes may be defined according to IPv4, IPv6 and/or some combination thereof. The prefix delegators 32, 34 may be considered as delegating routers and configured to register for or otherwise obtain their respective IP prefixes from a suitable prefix delegating source. Optionally, the prefix domains assigned to each of the prefix delegators 32, 34 and/or service providers 12, 14 may include subsets or multiple IP prefixes such that one or more of the ISP prefix delegator 32 and the MSO prefix delegator 34 are capable of providing multiple prefixes to the corresponding one of the data gateway 26 and the video gateway 30, such as in the matter defined in RFC 3633.

Block 46 relates to the MSO prefix delegator 34 and the ISP prefix delegator 32 respectively delegating the first IP prefix to the video gateway 30 and the second IP prefix to the data gateway 26. The video gateway 30 and the data gateway 26 may be considered as requesting routers operating according to DHCP to transmit a solicit message to which the prefix delegators 32, 34 respond with an advertisement message. The data gateway 26 and the video gateway 30 may transmit a request message to the one of the MSO prefix delegator 34 and the ISP prefix delegator 32 identified within the advertisement message to be suitable for prefix delegation. The prefix delegators 32, 34 may then transmit a reply message having the corresponding one of the first and the second IP prefixes to be used by the video and data gateways 30, 26. Optionally, the data gateway 26 and/or the video gateway 30 may be configured to periodically send the corresponding one of the MSO prefix delegator 34 and the ISP prefix delegator 32 a renew message in order to prevent expiration of previously assigned IP prefixes.

Block 48 relates to establishing a hierarchy or other sequence to define whether the data gateway 26 or the video gateway 30 should be used to provide reverse prefix delegation, i.e., whether the one of the data gateway 26 and the video gateway 30 will provide their prefix to the other one of the data gateway 26 and the video gateway 30 for delegation. The present invention is predominately described with respect to the video gateway 30 reversely delegating their IP prefix to the data gateway 26 as this scenario may be beneficial when Internet/cellular traffic or other traffic is destined for a network separated from another type of service, such as video services. The exemplary illustration is provided for non-limiting purposes as a demonstration of one of many possible scenarios where hardware requirements, communication reliability or licensing restraints may require certain addressing dependent processes in an environment where the accessing devices (CPE 16) desire or the subscribers associated therewith desire use of the same CPE 16 across multiple, prefix restrictive service providers. The data gateway 26 is shown to occupy a top layer of the hierarchy at least in so far as that it controls how the video gateway 30 delegates the first IP prefix, however, the present invention fully contemplates video gateway 30 or another gateway occupying the top layer.

Figure 3:
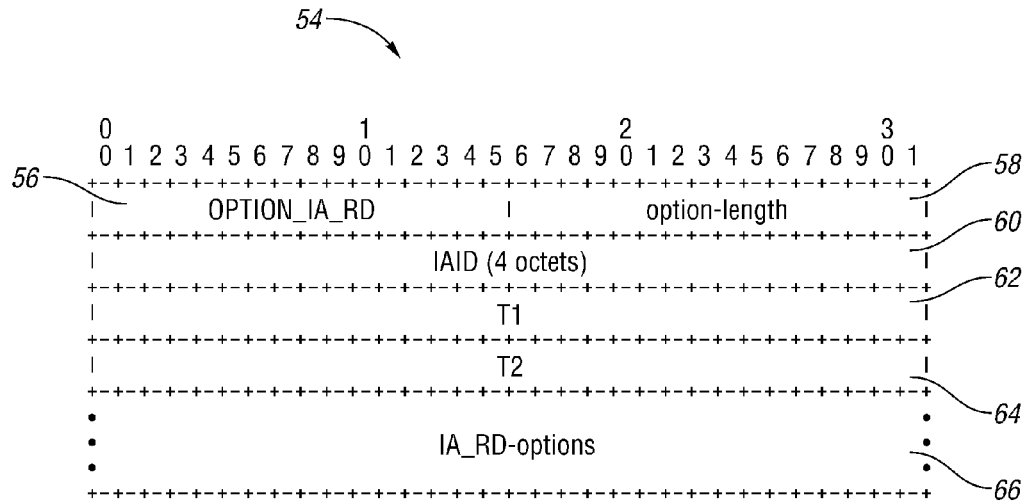
FIG. 3 illustrates a first routing delegation message in accordance with one non-limiting aspect of the present invention.

Block 50 relates to communicating a first routing delegation message from the video gateway 30 to the data gateway 26. The first routing delegation message may include routing information or other information sufficient for use in identifying the first IP prefix assigned by the MSO prefix delegator 34 to the data gateway 26. FIG. 3 illustrates the first routing delegation message 54 in accordance with one non-limiting aspect of the present invention. The first routing delegation message 54 may be referred to as an IA_RD option that is configured similarly to the IA_PD option defined in RFC 3633. Optionally, the IA_RD option may be executed by the video gateway 30 acting as a requesting gateway and the data gateway 26 acting as a delegating gateway such that the IA_RD option is exchanged in a manner analogous to which the IA_PD option is exchanged in the RFC 3633, except that the prefix may be exchanged in the client messages (SOLICIT, REQUEST) rather than the server messages (ADVERTISE, REPLY).

A first portion 56 of the IA_RD option may be an option-code, such as OPTION_IA_RD (25). A second portion 58 of the IA_RD may be an option-length, such as 12+length of IA_RD-options field. A third portion 60 of the IA_RD may be IAID, such as a unique identifier for the IA_RD that may be unique among the identifiers for all of the requesting router's IA_RDs. A fourth portion 62 of the IA_RD may be T1, which indicates a time that the requesting router should contact the delegating router from which the prefixes in the IA_RD were obtained to extend the lifetimes of the prefixes delegated to the IA_RD where T1 may be a time duration relative to the current time expressed in units of seconds. A fifth portion 64 of the IA_RD may be T2, which indicates a time at which the requesting router should contact any available delegating router to extend the lifetimes of the prefixes assigned to the IA_RD where T2 may be time duration relative to the current time expressed in units of seconds. A sixth portion 66 of the IA_RD may be IA_RD-options, such as associated with the IA_RD.

Figure 4:
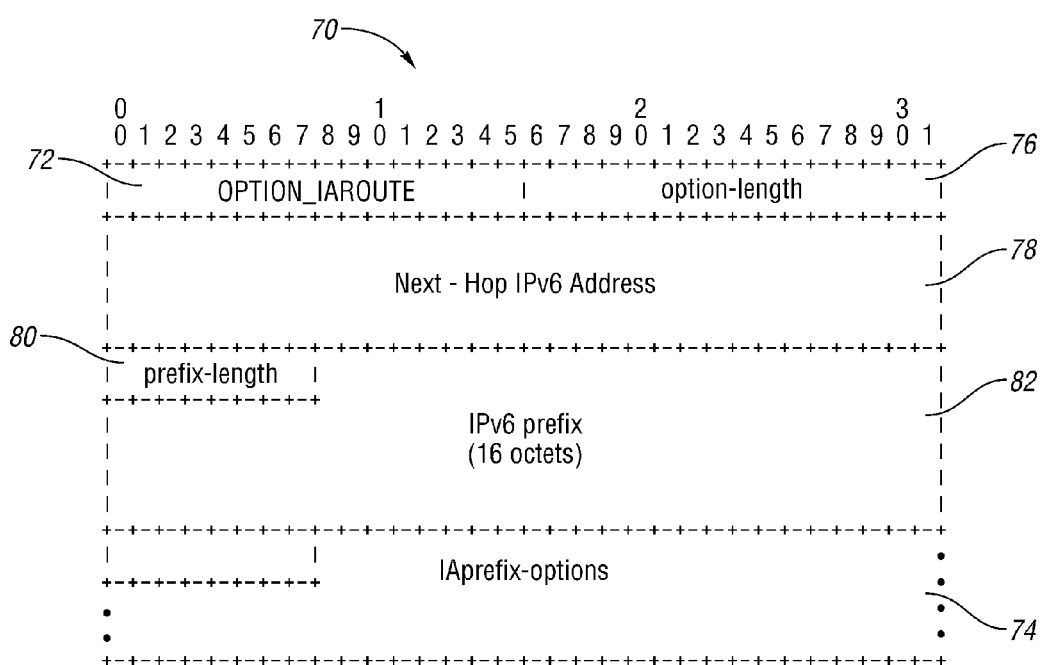
FIG. 4 illustrates a format of an IAROUTE prefix option for IA_RD-options in accordance with one non-limiting aspect of the present invention.

FIG. 4 illustrates a format 70 of an IAROUTE prefix option for the IA_RD-options in accordance with one non-limiting aspect of the present invention. The IAROUTE prefix may include OPTION_IAROUTE portion 72, similar to the OPTION_IAPREFIX in RFC 3633, and used here to specify IPv6 address prefixes associated with an IA_RD, which are the video/first IP Prefix(es) for CPEs to be delegated by the data gateway to specify video routes. A first portion 74 of the IAROUTE prefix option, IAprefix-options, may be used to identify the video/IP prefix(es) being reversely delegated to the video gateway. A second portion 76 of the IAROUTE prefix option may be an option-length, such as 12+length of IA_RD-options field. A third portion 78 of the IAROUTE prefix option may be a Next-Hop IPv6 Address, such as an address of the device with which the video gateway communicates messages routed therethrough to the video network. A fourth portion 80 of the IAROUTE prefix option may be a prefix-length, such as /64. A fifth 82 portion of the IAROUTE prefix option may be an IPv6 prefix, such as 2001:db8:0:1:: (shorthand for 2001:0 db8: 0000:0001:0000:0000:0000:0000).

Returning to FIG. 2, block 86 relates to the data gateway 26 generating a routing table. The routing table may be used by the data gateway 26 to route messaging between the CPE/IRs 16 and the Internet 22 and the video gateway 30 where messaging is subsequently routed through to the video network 24. FIG. 5 illustrates the routing table 88 as contemplated by one non-limiting aspect of the present invention. The routing table 88 represents three interfaces of the data gateway 26 and the messages routed therethrough according to addressing associated with the corresponding messaging/signaling. A first interface 90 may be used to interface signaling with the Internet, a second interface 92 may be used to interface signaling with the video gateway 30 in a third interface 94 may be used to interface signaling with the CPE/IRs 16. The routing table may be based on a most specific routing methodology where signaling is routed according to the one of the interfaces most closely matching with associated prefixes/addressing. In this manner, the data gateway 26 may be configured to facilitate differentiating message routing according to the included prefix/address.

The first interface 90 is shown to facilitate routing signaling between the Internet 22 and the CPE/IRs 16. The signaling routed therethrough may correspond with any signaling having an address which fails to fall within one of a plurality of second addresses (data addresses) subnetted within of the second IP prefix. The second interface 92 is shown to facilitate routing signaling between the CPE/IRs 16 and the video gateway 30 for subsequent routing to the video network 24. The signaling routed through the second interface 92 may correspond with that having addresses subnetted within the first IP prefix. The third interface 94 shown to facilitate routing signaling from the data gateway 26 to the CPE/IRs 16. The third interface 94 illustrates the data gateway 26 delegating at least a portion of the first IP prefix and the second IP prefix, shown as video and data IA_PD, to downstream IRs 16, and when CPE 16 are connected directly to the gateway, at least a portion of the first addresses and the second addresses, shown as video and data IA_NA, to downstream CPE 16.

Returning to FIG. 2, block 96 relates to delegating multiple prefixes. The multiple prefixes may correspond with the first and second IP prefixes being delegated by the data gateway 26 to the CPE/IR 16 s. The contemplated delegation may include the data gateway 26 delegating prefixes to IRs 16 and/or delegating addresses to directly connected CPE 16 such that delegation comprises delegating at least one of a prefix and an address within a domain of one of the prefixes delegated to the data gateway 26 and the video gateway 30. One non-limiting aspect of the present invention contemplates the data gateway 26 delegating the first and second IP prefixes, or portion thereof, to the CPE/IRs 16 according to DHCP. This may include the data gateway 26 exchanging messages with the CPE/IRs 16 in a manner similar to that described above with respect to the ISP prefix delegator 32 delegating the second IP prefix to the data gateway 26.

Block 98 relates to facilitating common link, multi-provider prefix routing. The multi-provider prefix routing may correspond with the data gateway 26 routing signaling between the CPE/IRs 16 and the Internet 22 and/or the video network 24 by way of the video gateway 30. The data gateway 26 may be configured to facilitate simultaneously routing signaling between the CPE/IRs 16 and the Internet 22 and/or the video network 24. The CPE 16 may be configured to selectively use the delegated first addresses and the second addresses when signaling depending on an intended recipient such that the second addresses are used for signaling destined for the Internet 22 and the first addresses are selected for signaling destined for the video network 24. The CPE 16 may be configured to use one of the first and second addresses as source and/or destination addresses such that the data gateway 26 may be configured to differentiate between the signaling according to whether one of the first addresses or the second addresses is included as one of the source and destination addresses. The multi-provider prefix routing may occur with the CPE 16 being connected over the common link 20 such that the CPE 16 may simultaneously or selectively communicate with the Internet 22 and the video network 24 to access the desired services while complying with prefix restrictions associated with the corresponding service providers.

Block 100 relates to communicating a second routing delegation message. The second routing delegation message may be transmitted from the data gateway 26 to the video gateway 30 or from the highest leveled gateway. The second routing delegation message may include routing information or delegating instructions sufficient for use by the video gateway 30 in delegating a portion of the first IP prefix to the CPE/IRs 16 for use over the secondary link 38. The portion of the first IP prefix made available to the video gateway 30 may be determined by the data gateway 26 and corresponding with a portion of the first IP prefix not being delegated or saved for delegation by the date gateway 26. The ability of the present invention to parse the first IP prefix such that some addresses are sufficient for use over the common link 20 and some are sufficient for use over the secondary link 38 may be beneficial in allowing the MSO 14 to facilitate dedicated or proprietary services with the CPE/IRs 16 without having to route related signaling through the data gateway 26. The CPE/IRs 16 receiving a portion of the first addresses falling within the second portion of the first IP prefix made available by the data gateway 26 to the video gateway 30 may be configured to select from the each of the three or more delegated addresses depending on whether the signaling is to be routed through the data gateway 26, through the data gateway 26 to the video gateway 30 or directly to the video gateway 30.

Blocks 102, 104 relate to the video gateway 30 performing similar delegating operations as that described above with respect to the data gateway 26 in order to facilitate addressing signaling to be carried over the secondary link 38. The ability to facilitate prefix delegation over the common link 20 and the secondary link 30 may be beneficial in environments where CPE/IRs 16 are capable of communicating over independent links.

As supported above, the present invention contemplates allowing a DHCP client device to notify a DHCP server about a block of addresses that it has learned from an alternate Service Provider. The invention defines a mechanism for a client device (e.g. video gateway) to distribute a MSO-provided IP prefix/subnet through a home network by sending it to a DHCP server (e.g. in a home router) for distribution throughout the home. The contemplated operations may include: the MSO network providing an IP prefix and routing information about video servers to a video gateway; the video gateway sending a message to the data gateway informing it of the MSO-provided prefix and routing information to the video servers; the data gateway installing a route to the video servers via the video gateway; the data gateway distributing the video prefix and data/Internet prefix throughout the home via standard DHCP; video traffic being routed through the video gateway by way of the date gateway and Internet traffic flowing through the data gateway One non-limiting aspect of the present invention contemplates a video gateway for a video-only subscriber in a home where another provider offers Internet access without a network address translator (NAT). The present invention may be beneficial when the following assumptions/requirement apply: video subscribers must use MSO-provided "video" addresses to contact MSO video servers due to content licensing restrictions; video traffic must not traverse the Internet—it must transit the video gateway; NAT should not be used; and only one DHCP server can be active on a particular link (or within the home)

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of delegating prefixes comprising:
  determining a home network having a data gateway configured to facilitate Internet signaling with an Internet service provider (ISP) network, the Internet signaling requiring data addresses derived from a data Internet protocol (IP) prefix provided to the data gateway from an ISP delegator;
  determining the home network having a video gateway configured to facilitate video signaling with a video network, the video signaling requiring video addresses derived from a video IP prefix provided to the video gateway from an video delegator;
  determining the home network having customer premise equipment (CPE) operating according to a plurality of restrictions, the restrictions including: (a) the CPE being prevented from being delegated data and/or video addresses directly from more than one of the data gateway and the video gateway and (b) the CPE being required to use the video addresses for the video signaling and the data addresses for data signaling; (c) translation of video addresses used for video signaling being prohibited; and (d) video signaling with the CPE being required to pass between the video network and the CPE through the video gateway;
  identifying the video IP prefix provided to the video gateway from information included within a routing delegation message transmitted from the video gateway to the data gateway;
  deriving the data and video addresses for the CPE at the data gateway using the data IP prefix provided thereto from the ISP delegator and the video IP prefix provided thereto from the video gateway within the routing delegation message, including deriving the data and video addresses such that each CPE is associated with a different one of the data addresses and a different one of the video addresses;
  delegating with the data gateway the data and video addresses derived for each CPE to the corresponding CPE through communications carried over a common link, the common link being sufficient to facilitate direct communications between each of the data gateway, the video gateway and the CPE;
  generating a routing table sufficient for use at the data gateway to route Internet signaling carried over the common link having one of the data addresses associated with the CPE to the ISP network and to route video signaling carried over the common link having one of the video addresses associated with the CPE to the video gateway such that the video gateway thereafter routes the video signaling to the video network;
  simultaneously routing the Internet and video signaling associated with one of the data addresses and the video addresses delegated to the CPE through the gateway, the gateway interfacing the corresponding Internet signaling with the ISP network through a first interface and the corresponding video signaling with the video gateway through a second interface; and
  interfacing through the first interface using a wireline interface and the second interface using a wireless interface sufficient for communicating over the common link with the video gateway.

2. The method of claim 1 further comprising requiring the CPE to select the data address transmitted thereto for the Internet signaling originating therefrom for transmission over the common link and to select the video address transmitted thereto for the video signaling originating therefrom for transmission over the common link.

3. The method of claim 1 further comprising delegating the data and video addresses from the data gateway to the CPE using Dynamic Host Configuration Protocol (DHCP).

4. The method of claim 1 further comprising requiring the CPE to communicate all of the Internet and video signaling associated with one of the data addresses and the video addresses delegated thereto to the data gateway.

5. A method of delegating Internet protocol (IP) prefixes over a common link directly interconnecting customer premise equipment (CPE) with both of a first requesting router and a second requesting router when the CPE is unable to receive IP prefixes from both of the first and second requesting routers over the common link, the method comprising:
  receiving at the second requesting router a first IP prefix from the first requesting router, the first requesting router receiving the first IP prefix from a first prefix delegator associated with a first network of a first service provider, the first service provider requiring addresses subnetted from within the first IP prefix in order to communicate over the first network;
  receiving at the second requesting router a second IP prefix from a second prefix delegator associated with a second network of a second service provider, the second service provider requiring addresses subnetted from within the second IP prefix in order to communicate over the second network;
  delegating the first IP prefix and the second IP prefix from the second requesting router over the common link such that the CPE each obtain at least one of a plurality of first addresses and at least one of a plurality of second addresses, the first addresses being subnetted from within the first IP prefix and the second addresses being subnetted from within the second IP prefix;
  generating a routing table sufficient for use at the second requesting router to route:
  i) a first signaling transmitted from the CPE to the second requesting router over the common link having one of the first addresses from the second requesting router to the first requesting router whereupon the first requesting router then routes the first signaling to the first network; and
  ii) a second signaling transmitted from the CPE to the second requesting router over the common link having one of the second addresses from the second requesting router to the second network without use of the first requesting router;
  creating the common link using the second requesting router such that the second requesting router is characterized as an edge router and the first requesting router is characterized as an internal router that provides reverse prefix delegation to the second requesting router; and
  transmitting from the second requesting router delegation instructions to the first requesting router, the delegation instructions identifying a portion of the first IP prefix usable by the first requesting router in subnetting a third plurality of addresses from the first IP prefix, the third addresses being different from the first addresses and suitable for facilitating communications between the first requesting router and the CPE over a secondary link independent of the common link.

6. The method of claim 5 further comprising delegating the first prefix and the second prefix from the second requesting router to the CPE using Dynamic Host Configuration Protocol (DHCP).

7. The method of claim 5 further comprising delegating the first prefix and the second prefix to the CPE such that the CPE is unable to communicate signaling directly to the first requesting router using one of the plurality of first and second addresses.

8. The method of claim 5 further comprising routing the first signaling through a first interface and the second signaling through a second interface of a second requesting router.

9. The method of claim 8 further comprising interfacing through the first interface using a wireless interface sufficient for communicating over the common link with the and the second interface using a wireline interface connected directly to the second network.

10. The method of claim 5 further comprising receiving the first IP prefix at the second requesting router within a routing delegation message transmitted from the first requesting router over the common link, a source address of the routing delegation message being one of the second addresses and being delegated from the second requesting router to the first requesting router.

11. The method of claim 5 further comprising instructing the CPE to generate the first signaling when desiring video signaling and the second signaling when desiring data signaling.

12. The method of claim 5 further comprising instructing the CPE to generate the first signaling when desiring multihoming data signaling and the second signaling when multihoming data signaling.

13. A method for facilitating signaling comprising:
  determining a system having customer premise equipment (CPE) connected to a common link and desiring to communicate with a first service provider via a first gateway and a second service provider via a second gateway when: (a) both of the first and second gateways are connected to the common link; (b) the first service provider requires signaling to include addresses subnetted within a first Internet Protocol (IP) prefix; (c) the second service provider requires signaling to include addresses subnetted within a second IP prefix; (d) the CPE requires the addresses and/or the first and second IP prefixes to be delegated over the common link; (e) the CPE are unable to receive the addresses and/or the first and second IP prefixes from both of the first and second gateways when connected to the common link, (f) the first gateway is unable to obtain the second IP prefix independently of the second gateway; and (g) the second gateway is unable to obtain the first IP prefix independently of the first gateway;
  controlling the first gateway to obtain the first IP prefix from the first service provider;
  controlling the first gateway to obtain the second IP prefix from the second gateway;
  controlling the first gateway to delegate each CPE at least one of an address or a prefix subnetted within the first IP prefix received from the first service provider and at least one of an address or a prefix subnetted within the second IP prefix received from the second gateway;
  controlling the first gateway to route a first message transmitted over the common link thereto from one of the CPE:

i) directly to the first service provider when a first address included therein as a destination address is subnetted within the first IP prefix; and ii) indirectly to the second service provider via the second gateway when the first address is subnetted within the second IP prefix controlling the first gateway to generate a routing table sufficient for associating the first IP prefix with the first service provider and the second IP prefix with the second gateway;

controlling the first gateway to compare the first address to the first and second IP prefixes included within the router table in order to determine whether the first address is subnetted within the first or second IP prefix; and instructing the CPE transmitting the first message to select the first address to be within the first IP prefix when associated with data traffic for the Internet and to be within the second IP prefix when associated with video traffic.

14. The method of claim 13 further comprising controlling the first gateway to route the first message to the second gateway when the first address is subnetted within the second IP prefix without translating the first address such that the first message is received at the second gateway with the first address as the destination address.

* * * * *